US008630973B2

(12) United States Patent
Becher et al.

(10) Patent No.: US 8,630,973 B2
(45) Date of Patent: Jan. 14, 2014

(54) DISTRIBUTED PROCESSING SYSTEM FOR CALCULATIONS BASED ON OBJECTS FROM MASSIVE DATABASES

(75) Inventors: Jens Becher, Steinberg (DE); Bernd Hartmann, Walldorf (DE); Michael Hild, Walldorf (DE); Ekkehard Lange, Karlsruhe (DE)

(73) Assignee: SAP AG, Walldorf (DE)

( * ) Notice: Subject to any disclaimer, the term of this patent is extended or adjusted under 35 U.S.C. 154(b) by 1685 days.

(21) Appl. No.: 10/836,248

(22) Filed: May 3, 2004

(65) Prior Publication Data

US 2005/0246323 A1    Nov. 3, 2005

(51) Int. Cl.
    *G06F 17/30*    (2006.01)
(52) U.S. Cl.
    USPC ......................................................... 707/607
(58) Field of Classification Search
    USPC .............................. 707/3, 103, 607
    See application file for complete search history.

(56) References Cited

U.S. PATENT DOCUMENTS

| | | | | |
|---|---|---|---|---|
| 5,634,053 A | * | 5/1997 | Noble et al. | ........................ 707/4 |
| 5,980,090 A | * | 11/1999 | Royal et al. | .................... 700/241 |
| 6,615,203 B1 | * | 9/2003 | Lin et al. | ........................... 707/3 |
| 2001/0047353 A1 | * | 11/2001 | Talib et al. | ........................ 707/3 |
| 2002/0065829 A1 | * | 5/2002 | Neuhaus et al. | ............... 707/100 |
| 2003/0167153 A1 | * | 9/2003 | Alexander | ..................... 702/189 |
| 2003/0237084 A1 | * | 12/2003 | Neiman et al. | ................. 718/102 |
| 2004/0181524 A1 | * | 9/2004 | Jardin | ................. 707/3 |
| 2004/0205049 A1 | * | 10/2004 | Aggarwal | ......................... 707/3 |
| 2005/0193088 A1 | * | 9/2005 | Dittrich et al. | ................. 709/217 |
| 2006/0100957 A1 | * | 5/2006 | Buttler et al. | .................... 705/38 |

* cited by examiner

*Primary Examiner* — Hosain Alam
*Assistant Examiner* — Johnese Johnson
(74) *Attorney, Agent, or Firm* — Kenyon & Kenyon LLP

(57) ABSTRACT

Calculations to be performed on a massive data set may be delegated to a plurality of local servers for parallel processing. Each local server advances through a subset of database objects to determine if the objects are relevant to the calculation. If so, the objects' data is used as an operand to the calculation to generate intermediate results at the local server. The intermediate results of the various local servers are transmitted to a central server, which generates final results and transmits them back to the local servers. The local servers write the final results into each object in its respective subset, where relevant. The method is efficient because each object in the database is opened at most twice. Opening and closing database objects often involve transfers from bulk storage and, therefore, are some of the most time-consuming operations that computer systems perform.

32 Claims, 4 Drawing Sheets

100

200

300

500

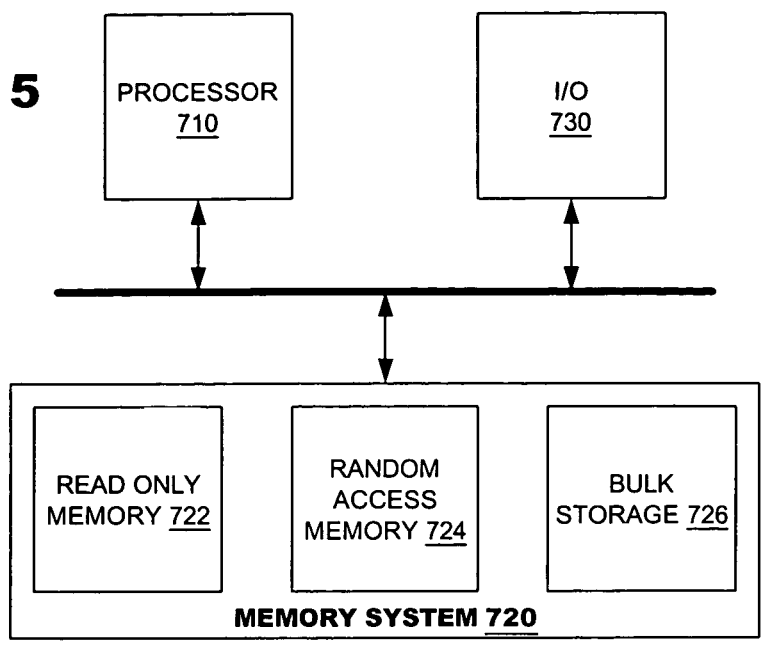

DISTRIBUTED PROCESSING SYSTEM FOR CALCULATIONS BASED ON OBJECTS FROM MASSIVE DATABASES

BACKGROUND

Embodiments of the present invention relate to processing methods and systems for performing arithmetic calculations on massive databases.

Modern firms rely on computer systems to manage their business processes and generate electronic records from their operations. These computer systems often require sophisticated, large-scale database systems to store such records. Often, the firms require calculations to be performed on various records. Many of the calculations (e.g., a sum of given transactions, an average of given transactions) may use data from a variety of database objects as operands. Of course, the calculations' operands may not be easily identifiable.

Consider a bank as an example. Banks commonly maintain records regarding member accounts or other instruments (e.g., loans, options, etc.). If a bank were required to sum up principal amounts, of for example, all loans of a given type having an expiration date within a particular calendar year, the computer system first would have to search serially through its database records to identify objects that satisfy the search criterion, then it would perform the commanded calculation. For a bank that stores information regarding a million instruments, this process consumes a considerable amount of time. The expense of these calculations becomes particularly acute when the bank must perform multiple calculations with multiple divergent search criteria.

Accordingly, there is a need in the art for a processing scheme for performing arithmetic calculations on large-scale databases.

BRIEF DESCRIPTION OF THE DRAWINGS

FIG. 5 is a simplified block diagram of a server.

DETAILED DESCRIPTION

Embodiments of the present invention provide a processing method for performing arithmetic calculations and the like upon databases of large size. According to the embodiment, subsets of database objects are distributed among several distributed servers. The calculations may be performed upon the database subsets to generate intermediate results. The intermediate results may be processed at a central server(s) to generate final results. The final results may be distributed back to the distributed servers to be written back to the objects.

Figure 1:
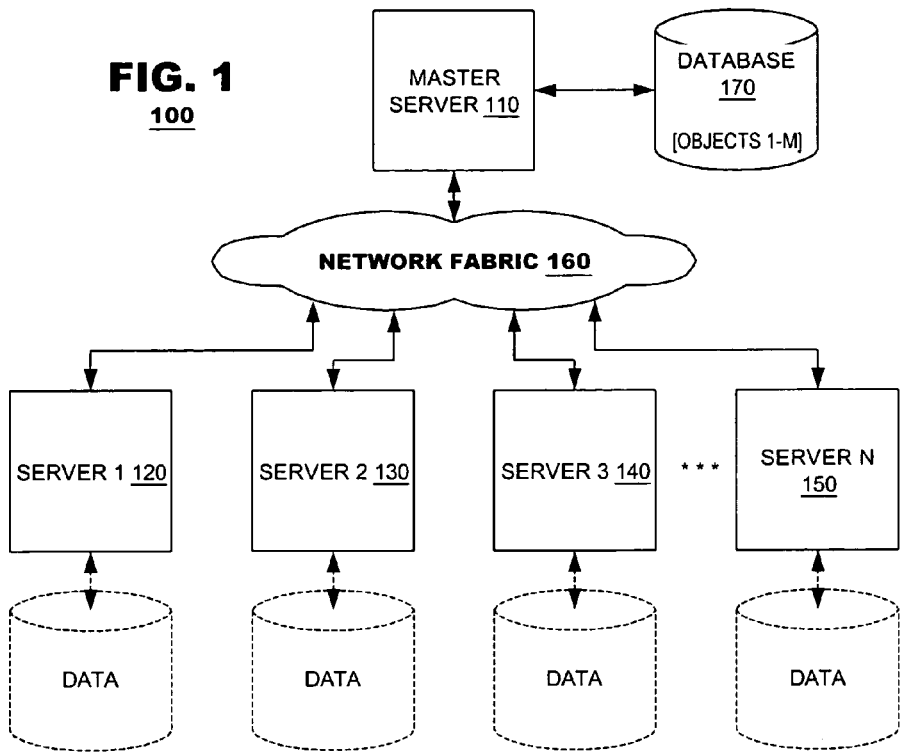
FIG. 1 is a simplified block diagram of a computer system.

FIG. 1 illustrates a computer network 100 according to an embodiment of the present invention. The network 100 is illustrated as including a plurality of n servers 110-150 interconnected via a network fabric 160. For purposes of the instant discussion, one server 110 may be considered a 'master' server. The master server may have access to a database 170 that includes m objects. Typically, $m \gg n$. For example, there may be a million or more objects assigned to 10-20 servers 110-150.

It is expected that the database 170 may store massive amounts of data as is typical for financial institutions such as banks or credit card companies. The database may be organized into objects where an object represents an account or an individual transaction. It is expected that the database may store several millions of objects during the ordinary course of operation. Although FIG. 1 illustrates a database 170 as being provided in a single network location, the principles of the present invention also find application with a distributed database system. Accordingly, FIG. 1 illustrates additional databases in phantom provided in association with the other servers 120-150.

According to an embodiment, the network 100 performs periodic calculations upon the database objects. Given the large size of the database, multiple servers 110-150 are engaged to perform the calculations in parallel. For many of these calculations, results are dependent upon data from multiple objects, some of which may be distributed among multiple servers. For example, in a banking application, one such calculation may require the network to sum up account balances for each unique account owner maintained by the system or to calculate an average on accounts of a predetermined type. The objects representing such account may be distributed across any number of the servers.

Figure 2:
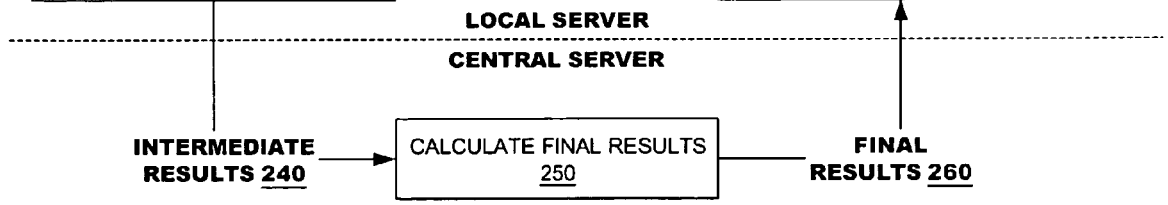
FIG. 2 is a flow diagram of a method according to an embodiment of the present invention.

FIG. 2 illustrates a method of operation according to an embodiment of the present invention. According to the embodiment, database objects are distributed among the set of available servers to generate intermediate calculation results in parallel, each server operating on a unique subset of the database's contents. The intermediate results may be transferred to a common centralized server (perhaps the master server 110) where final results are calculated. This calculation may also be done in parallel by making use of the network fabric and the plurality of the local servers. Thereafter, the final results are returned to each of the local servers where they are written to each of the objects to which the results apply.

According to an embodiment, each local server performs a series of operations locally to derive intermediate results. Thus, the local server may open each object (box 210), perform the relevant calculation (box 220) and close the object (box 230). After the local server processes all of the objects assigned to it, it stores locally intermediate results which are transferred to a central server for further processing (box 240). Of course, if the central server itself performs the operations represented in boxes 220-240, it need not transmit the intermediate results to itself.

The central server generates final results from the intermediate results generated by the various local servers 110-150 (box 250). The final results may be transmitted back to the local servers (box 260) that processed objects that contributed to the final results. In other words, if one of the local servers stored objects that are completely irrelevant to the final results, there is no need to transmit the final results back to that particular server.

The local servers may open the various objects that contributed to the final results generated by the central server (box 270). The final results are written to the objects (box 280) and the objects are closed (box 290). At that point, the method may terminate.

The foregoing method is advantageous because it permits quick access to data that is generated from a survey of a massive database at modest computational cost. The foregoing embodiment can perform its calculations with only two accesses to each data object in the data set. In large database systems, the act of opening and closing objects typically is a very costly process because a server must read the object from long term storage (e.g., magnetic disk drives or the like) to system memory, operate on the object as needed and return the object to storage. By limiting the number of times each object is opened and closed, the foregoing method conserves processing expense.

Figure 3:
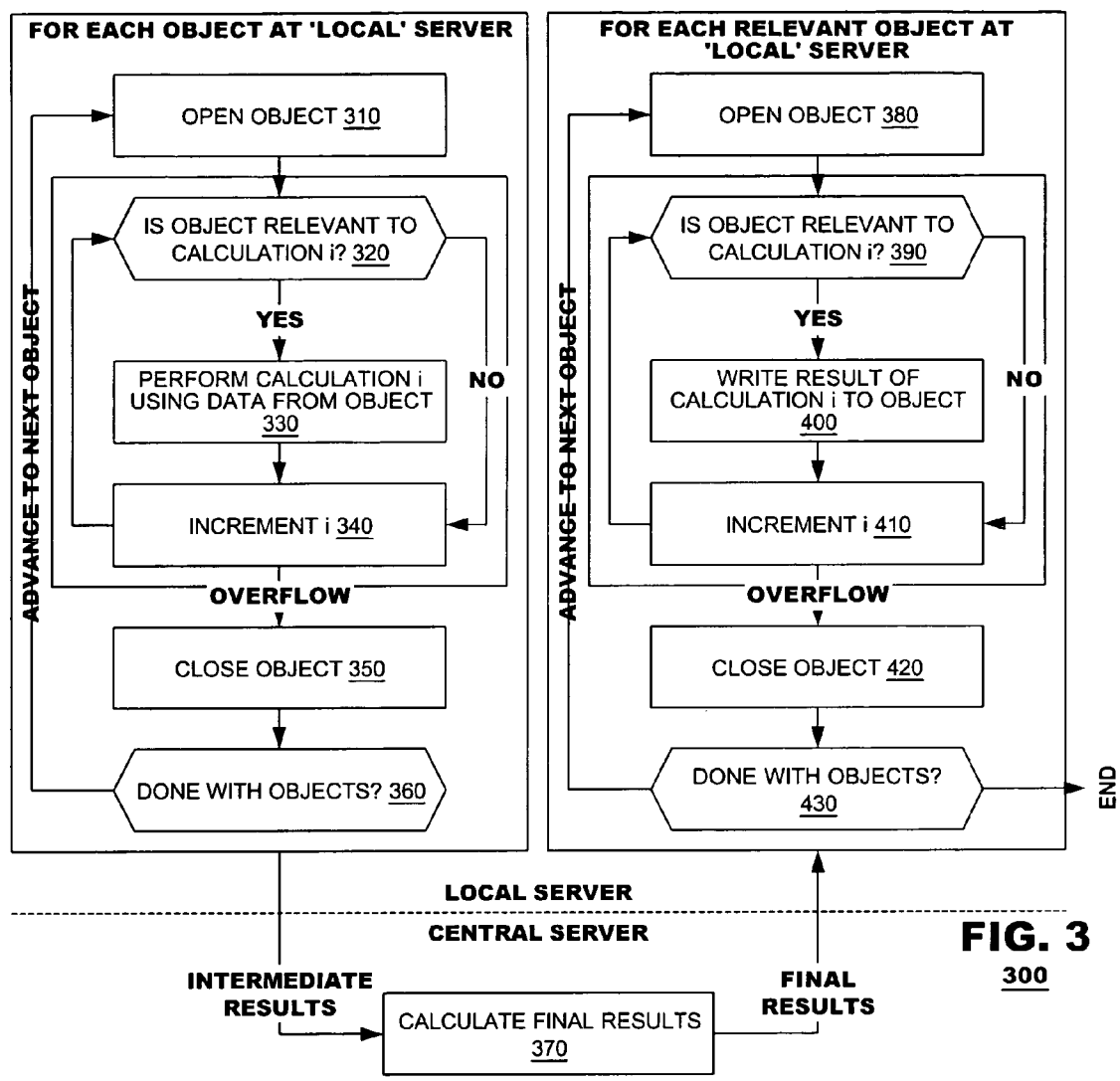
FIG. 3 is a flow diagram of a method according to an embodiment of the present invention.

In many applications, a computing system is compelled to perform several dependent calculations upon the database. In such situations, additional processing expense is conserved by scheduling the calculations to be run simultaneously in a common batch process. Such an embodiment is illustrated in the method of FIG. 3.

In this embodiment, a series of database calculations are defined to be run in parallel. According to the method, at each local server, the server opens each object to which it is assigned (box 310). The local server then steps through each of the calculations to determine if the open object matches search criteria for the calculation (box 320). If so, the server gathers data from the object that is relevant to the calculation (box 330). If not or following operation of box 330, the server advances to consider the next calculation (box 340). Once the server considers the object against all the calculations that are to be performed, the server closes the open object (box 350). Unless the server has completed processing of all objects to which it is assigned (box 360), the server advances to a next object and repeats the process. Otherwise, the server transfers its intermediate results for all calculations to the central server.

Once intermediate results have been received from the various local servers, the central server can generate final results for each of the calculations and transmit the final results back to the local servers (box 370). As noted, calculation of final results may be distributed across multiple servers.

The local servers open each object in sequence (box 380). The servers step through each calculation and determine whether the object is relevant to the calculation (box 390). If so, the server writes the final result from the calculation to the object and advances to the next calculation (boxes 400, 410). Once data from all the relevant calculations has been written to the object, the object is closed (box 420). Thereafter, the method advances to the next object until the server completes writing results to the last of the objects (box 430).

During operation of boxes 310-360, the server may identify in its cache which objects were relevant to which calculation. When operation advances to boxes 380-430, if the server determines that a given object n is not relevant to any of the calculations being performed, the server may omit the operations with respect to that object. If the object's data is not relevant to any of the calculations, there is no need to write final results from any calculation back to the object.

Figure 4:
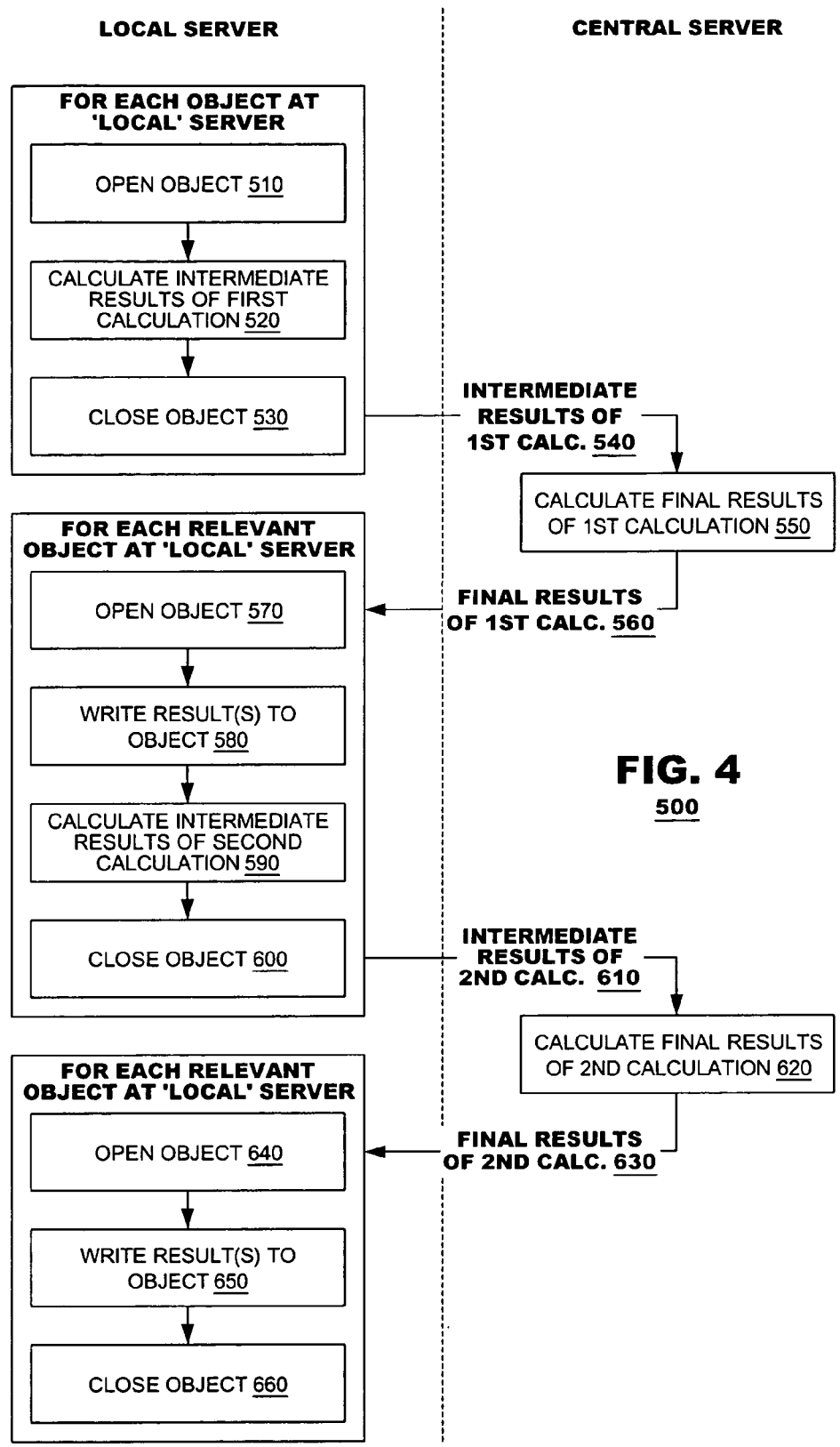
FIG. 4 is a flow diagram of a method according to another embodiment of the present invention.

FIG. 4 illustrates a method according to another embodiment of the present invention. This embodiment finds application with systems that perform calculations across massive data sets in which results of one or more calculations are input operands to another calculation. The method may begin with parallel operations to be performed at a plurality of local servers. At each local server, the method may cause an object to be opened (box 510) and, while the object is opened, the method may perform a first calculation (box 520). The method may close the object (box 530) and repeat operation until all objects have been reviewed for relevance to the first calculation. Thereafter, the local server may transfer intermediate results of the first calculation to a central server (box 540). Once the central server receives intermediate results from all the local servers, it may generate a final result of the first calculation (box 550) and report the results back to the local servers (560).

The local servers may open each object again (box 570) and write results data to those objects for which the results are relevant (box 580). Additionally, the local servers may perform a second calculation using data from the final results of the first calculation and data from the open object (box 590). The method may close the open object (box 600) and repeat operation until all objects have been reviewed for relevance to the second calculation. Thereafter, the local server may transfer intermediate results of the second calculation to the central server (610). Once the central server receives intermediate results from all the local servers, it may generate a final result of the second calculation (box 620) and report the results back to the local servers (630).

Responsive to the reported final results from the second calculation, the local servers may object those objects to which the results are relevant and write the final results thereto. The local servers may open each object (box 640), write the final results of the second calculation (box 650) and close the object (box 660). At that point, the method may terminate.

The foregoing embodiments may provide a software-implemented system. As such, these embodiments may be represented by program instructions that are to be executed by a server or other common computing platform. One such platform 700 is illustrated in the simplified block diagram of FIG. 5. There, the platform 700 is shown as being populated by a processor 710, a memory system 720 and an input/output (I/O) unit 730. The processor 710 may be any of a plurality of conventional processing systems, including microprocessors, digital signal processors and field programmable logic arrays. In some applications, it may be advantageous to provide multiple processors (not shown) in the platform 700. The processor(s) 710 execute program instructions stored in the memory system. The memory system 720 may include any combination of conventional memory circuits, including electrical, magnetic or optical memory systems. As shown in FIG. 4, the memory system may include read only memories 722, random access memories 724 and bulk storage 726. The memory system not only stores the program instructions representing the various methods described herein but also can store the data items on which these methods operate. The I/O unit 730 would permit communication with external devices (not shown).

Throughout the discussion, reference to 'local' servers and 'central' servers helps to distinguish distributed, parallel processes from centralized processes. However, the principles of the present invention also permit calculation of final results to be distributed among a plurality of servers. For example, local servers may transmit intermediate results for a first calculation to a first server and also transmit intermediate results for a second calculation to a second server. Each of the first and second server may generate final results for the respective calculations and report those final results to the local servers. In this manner, each final results calculation is done at a different, central server.

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. A method of performing a calculation on objects of a distributed database, comprising:
at each of a plurality of local servers:
opening, by a computer processor, a subset of the objects, each object providing unique data input to the calculation,
performing, by the computer processor, the calculation on the subset of the objects to generate intermediate results therefrom,
storing, by the computer processor, the intermediate results on the local server, and
closing the objects;
transmitting, by the computer processor at each of the plurality of local servers, the intermediate results to a central server;
generating, by a computer processor at the central server, final results of the calculation from the intermediate results obtained by the local servers;
transmitting, by the computer processor at the central server, the final results to the plurality of local servers; and
at the plurality of local servers,
opening objects for which the final results are relevant, writing the final results to the relevant objects, and closing the relevant objects.

2. The method of claim 1, wherein the objects of the database have a total number, and the local servers have a total number, and wherein the total number of the objects of the database is greater than the total number of the local servers.

3. The method of claim 1, wherein the database has components thereof stored on each of the servers.

4. The method of claim 1, further comprising, before the performing, determining whether the opened objects are relevant to search criteria defined for the calculation.

5. The method of claim 1, wherein, at each of the local servers, objects are opened and closed in succession.

6. A method of performing a calculation on objects of a database, comprising:
at a plurality of local servers:
opening, by a computer processor, a subset of the objects, each object providing unique data input to the calculation,
performing, by the computer processor, a plurality of calculations on the subset of objects to generate intermediate results therefrom, and
closing, by the computer processor, the objects;
transmitting the intermediate results to a first and second central server;
generating, by a computer processor at the first central server, final results of a first calculation from the intermediate results obtained by the local servers;
generating, by a computer processor at the second central server, final results of a second calculation from the intermediate results obtained by the local servers;
transmitting the final results to the plurality of local servers; and
at the plurality of local servers,
opening objects for which the final results are relevant, writing the final results to the relevant objects, and closing the relevant objects.

7. The method of claim 6, further comprising, before the performing, determining whether the opened objects are relevant to search criteria defined for the calculation.

8. The method of claim 6, wherein, at each of the local servers, objects are opened and closed in succession.

9. A method of performing a calculation on objects of a distributed database, comprising:
at a plurality of local servers:
opening, by a computer processor, a subset of the objects, each object providing unique data input to the calculation,
performing, by the computer processor, a first calculation on the subset of objects to generate intermediate results of the first calculation, and
closing, by the computer processor, the objects;
transmitting the intermediate results of the first calculation to a central server;
generating, by a computer processor at the central server, final results of the first calculation from the intermediate results of the first calculation;
transmitting the final results of the first calculation to the plurality of local servers;
at the plurality of local servers:
opening the objects,
performing a second calculation on the subset with reference to the first result to generate intermediate results to the second calculation, and
closing the objects;
transmitting the intermediate results to the second calculation to the central server;
generating, by the computer processor at the central server, final results of the second calculation;
transmitting the final results of the second calculation to the plurality of local servers; and
at the plurality of local servers,
opening objects for which the final results of the second calculation are relevant,
writing the final results of the second calculation to the relevant objects, and
closing the relevant objects.

10. The method of claim 9, further comprising, before the performing, determining whether the opened objects are relevant to search criteria defined for the calculation.

11. The method of claim 9, wherein, at each of the local servers, objects are opened and closed in succession.

12. A method of performing a calculation on objects at a server, comprising:
during a first stage of operation:
opening, by a computer processor, a plurality of objects assigned to the server,
each object providing unique data input to the calculation,
comparing, by the computer processor, data from each open object to a search criterion,
generating, by the computer processor, an intermediate result from objects whose data matches the search criterion,
closing, by the computer processor, the objects,
transmitting, by the computer processor, the intermediate result for the calculation from the server to a central server,
receiving a final result for the calculation from the central server,
during a second stage of operation:
opening objects to which the final result is relevant,
writing the final result to each of the relevant objects, and
closing the relevant objects.

13. The method of claim 9, wherein the method is repeated at each of a plurality of servers.

14. The method of claim 9, further comprising,
during the first stage of operation, creating a log of the objects that match the search criteria and during the second stage of operation, opening only those objects that are identified on the log.

15. The method of claim 9, wherein, at each of the local servers, objects are opened and closed in succession.

16. An arithmetic method for objects of a database, comprising:
scheduling a plurality of calculations, each having its own search criterion,
at each of a plurality of local servers, iteratively
opening, by a computer processor, an object assigned to the respective server, each object providing unique data input to the calculation,
comparing, by the computer processor, data from the object to the search criteria,
when the object matches the search criterion of one or more calculations, generating, by the computer processor, intermediate results for the respective calculation(s) from the object's data, storing the intermediate results at each of the local servers, and
closing the object,
transmitting intermediate results to a central server,
generating final results of the calculations by a computer processor at the central server,
transmitting the final results of the calculations to the local servers, and
at each of the local servers, iteratively:
opening objects assigned to the local server,
writing relevant final results to the opened objects, and
closing the objects.

17. The method of claim 16, wherein the total number of database objects greatly outweighs the number of local servers.

18. The method of claim 16, wherein the database is a distributed database, having components thereof stored on each of the servers.

19. The method of claim 16, wherein, at each of the local servers, objects are opened and closed in succession.

20. A method of performing a calculation on objects at a server, comprising:
scheduling a plurality of calculations, each having its own search criterion,
during a first stage of operation:
opening, by a computer processor, a plurality of objects assigned to the server, each object providing unique data input to the calculation,
comparing, by the computer processor, data from each open object to the search criteria,
generating, by the computer processor, an intermediate result from objects whose data matches the search criteria,
closing the objects,
transmitting, by the computer processor, the intermediate result for the calculations from the server to a central server,
receiving a final result for the calculations from a central server,
during a second stage of operation:
opening objects to which the final result is relevant,
writing the final result to each of the relevant objects, and
closing the relevant objects.

21. The method of claim 20, wherein the method is repeated at each of a plurality of servers.

22. The method of claim 20, further comprising,
during the first stage of operation, creating a log of the objects that match the search criteria and
during the second stage of operation, opening only those objects that are identified on the log.

23. The method of claim 20, wherein, at each of the local servers, objects are opened and closed in succession.

24. A computer system, comprising:
a database system storing a plurality of objects, the database distributed over a plurality of servers, each local database comprising a unique subset of the objects and
a plurality of computer servers, one of which designated a central server and others are designated local servers, wherein
the local servers open a subset of the objects, each object providing unique data input to the calculation, perform a calculation on the opened subset to generate intermediate results therefrom, store the intermediate results on the local server, and close the objects;
the central server receives intermediate results from the local servers, generates final results of the calculation from the intermediate results and transmits the final results to the local servers, and
the local servers further open objects for which the final results are relevant, write the final results to the relevant objects, and close the relevant objects.

25. The system of claim 24, wherein the total number of database objects greatly outweighs the number of local servers.

26. The system of claim 24, wherein the database has components thereof stored on storage devices of each of the local servers.

27. The system of claim 24, wherein, at each of the local servers, objects are opened and closed in succession.

28. The system of claim 24, wherein the central server is also designated as a local server.

29. An arithmetic method for objects of a database having a total number of database objects, comprising:
at each of a plurality of local servers:
receiving, by a computer processor, an assignment of objects from a first server;
receiving, by the computer processor, a plurality of search criteria and for each search criteria a corresponding calculation to perform on the assignment of objects;
retrieving, by the computer processor, each object of the assignment of objects from the database, wherein each object comprises a first set of data and a second set of data, and wherein at least one object of the assignment of objects is retrieved from long-term storage;
determining for each of the objects whether the first set of data of the object satisfies each of the search criteria, and when the first set of data satisfies the search criteria: performing the calculation corresponding to the search criteria using the second set of data of the object and an intermediate result corresponding to the search criteria, and storing an object identification corresponding to the object in a log, wherein the result of performing the calculation is stored in the intermediate result and wherein the intermediate result is stored on the local server;
sending each of the intermediate results to the first server, wherein the first server calculates a final calculation for each of the intermediate results based on the intermediate result of each of the plurality of local servers;
receiving a final calculation for each of the intermediate results from the first server;
for each object identification in the log, retrieving the object corresponding to the object identification, and storing the final calculation for each of the intermediate results in the object, and storing the object in the database.

30. The method of claim 29, wherein the total number of database objects is much larger than the plurality of local servers, and wherein most of the objects are stored in long-term storage.

31. The method of claim 29, wherein storing an object identification corresponding to the object in a log further comprises, storing the object at the local server, and wherein retrieving the object corresponding to the object identification, further comprises retrieving the object from the local server.

32. The method of claim 31, wherein the majority of the database objects are stored in long-term storage, and wherein each of the database objects is read at most once from long-term storage.

* * * * *